United States Patent
Barrett-Kahn et al.

(10) Patent No.: US 9,361,395 B2
(45) Date of Patent: Jun. 7, 2016

(54) SYSTEM AND METHOD FOR PROVIDING OFFLINE ACCESS IN A HOSTED DOCUMENT SERVICE

(75) Inventors: David Barrett-Kahn, Chicago, IL (US); Nikolas Alexander Coukouma, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 369 days.

(21) Appl. No.: 13/561,173

(22) Filed: Jul. 30, 2012

(65) Prior Publication Data

US 2013/0054514 A1  Feb. 28, 2013

Related U.S. Application Data (60) Provisional application No. 61/528,472, filed on Aug. 29, 2011.

(51) Int. Cl.
*G06F 17/30* (2006.01)

(52) U.S. Cl.
CPC .................. *G06F 17/30902* (2013.01)

(58) Field of Classification Search
CPC . G06F 8/65; G06F 17/30902; G06F 17/3089; G06F 17/30873; G06F 9/45529; G06F 17/30899; G06F 17/30994; G06F 17/30964; G06F 17/30867
USPC ................................................. 707/705–780
See application file for complete search history.

(56) References Cited

U.S. PATENT DOCUMENTS

| | | | |
|---|---|---|---|
| 7,272,782 B2 | 9/2007 | Sneh | |
| 7,370,066 B1 | 5/2008 | Sikchi et al. | |
| 7,698,280 B2 * | 4/2010 | Bhat | G06Q 10/06 707/637 |
| 7,966,426 B2 * | 6/2011 | Smith et al. | 709/248 |
| 8,001,215 B2 * | 8/2011 | Dominowska | G06F 17/30867 709/218 |
| 2004/0107296 A1 | 6/2004 | Donker et al. | |
| 2004/0205538 A1 | 10/2004 | Banerjee et al. | |
| 2005/0102370 A1 | 5/2005 | Lin et al. | |
| 2008/0201449 A1 * | 8/2008 | Huang | H04L 67/06 709/218 |
| 2011/0302288 A1 * | 12/2011 | Davis | G06F 17/30899 709/223 |

OTHER PUBLICATIONS

Jakobsson, Markus, et al., "Invasive Browser Sniffing and Countermeasures", Proceedings on the 15th International Conference on World Wide Web, WWW '06, Jan. 1, 2006, pp. 523-532.

PCT International Search Report, dated Nov. 12, 2012, corresponding to PCT Application No. PCT/US2012/051404 filed Aug. 17, 2012, 4 pages.

(Continued)

*Primary Examiner* — Michelle Owyang
(74) *Attorney, Agent, or Firm* — Ropes & Gray LLP (57) ABSTRACT

A request for a document is received at a user device while in an offline state. The request includes a public uniform resource locator (URL) corresponding to a location remote from the user device. The user device launches an application that intercepts the request and selects one of multiple local caches based on the public URL. Each of the multiple local caches is associated with a private URL. The user device accesses the selected local caches via a corresponding private URL to retrieve an editor. The user device modifies a URL history to replace the private URL with a public URL and provides the document, via the editor, to the user device.

20 Claims, 8 Drawing Sheets

(56) References Cited

OTHER PUBLICATIONS

PCT Written Opinion of the International Searching authority, dated Nov. 12, 2012, corresponding to PCT Application No. PCT/US2012/051404 filed Aug. 17, 2012, 8 pages.

HTML Living Standard downloaded from http://www.whatwg.org/specs/web-apps/current-work/multipage/offline.html, Nov. 11, 2011, 21 pages.

* cited by examiner

SYSTEM AND METHOD FOR PROVIDING OFFLINE ACCESS IN A HOSTED DOCUMENT SERVICE

CROSS REFERENCE TO RELATED APPLICATIONS

This application claims benefit, pursuant to 35 U.S.C. §119 (e), of U.S. Provisional Application Ser. No. 61/528,472 filed Aug. 29, 2011, which is hereby incorporated herein by reference in its entirety.

This application is related to U.S. patent application Ser. No. 13/166,844 filed Jun. 23, 2011; U.S. patent application Ser. No. 13/117,386 filed May 27, 2011; U.S. patent application Ser. No. 13/101,312 filed May 5, 2011; U.S. patent application Ser. No. 13/075,402 filed Mar. 30, 2011; U.S. patent application Ser. No. 13/206,896 filed Aug. 10, 2011; U.S. patent application Ser. No. 13/207,051 filed Aug. 10, 2011; U.S. patent application Ser. No. 13/207,117 filed Aug. 10, 2011; U.S. patent application Ser. No. 13/207,176 filed Aug. 10, 2011; U.S. patent application Ser. No. 13/006,259 filed Jan. 13, 2011; U.S. Provisional Application No. 61/381,780 filed Sep. 10, 2011; U.S. Provisional Application No. 61/448,715 filed Mar. 3, 2011; and U.S. Provisional Application No. 61/453,238 filed Mar. 16, 2011, all of which are herein incorporated by reference.

TECHNICAL FIELD

This specification relates generally to systems, methods and apparatus for providing offline access in a hosted document service and more particularly to systems, methods and apparatus for providing offline access in a hosted document service to a plurality of documents.

BACKGROUND

Existing systems provide limited capability to users accessing online applications while in an offline mode. In existing document processing applications, users may edit documents locally. In existing online document processing applications, users may edit documents while in an online state by accessing a webpage. However, when a user's device is in an offline mode, functionality is limited. For example, if the user device attempts to access an online document while in an offline state, the user's browser may return an error message indicating that Internet connection is lost or unavailable and that the user device is unable to connect to the webpage.

Some browsers, while a user device is in an offline state, may display cached data (e.g. data stored in the browser cache) associated with certain webpages. However, functionality is limited and when an attempt is made to access a hyperlink within the webpage or make edits to a document within a webpage, an error message (as described above) is typically displayed.

SUMMARY

In accordance with an embodiment, a request for a document is received at a user device while in an offline state. The request comprises a public uniform resource locator corresponding to a location remote from the user device. An application is launched that intercepts the request. One of a plurality of local caches containing applications capable of viewing documents is selected based on the public uniform resource locator. Each of the plurality of local caches is associated with a private uniform resource locator. The selected local cache is accessed via a corresponding private uniform resource locator to retrieve an editor. A uniform resource locator history is modified to replace the private uniform resource locator with the public uniform resource locator. The document is provided, via the editor, to the user.

In an embodiment, the private uniform resource locator comprises an address of an Internet page with a durable locally cached copy.

In an embodiment, the document is stored in a database on the user device. In another embodiment, in response to determining that the user device is in an online state, a second editor application is launched, where the second editor application is configured to communicate with a server at the location remote from the user device. In an embodiment, edits made to the document at the user device are stored at the user device and the changes are transmitted to the server. In another embodiment, a request to the server to poll for updates to the document is transmitted. In response to polling the server for updates to the document, the updates are received.

In an embodiment, information about the document and the user device is retrieved from storage.

These and other advantages of the present disclosure will be apparent to those of ordinary skill in the art by reference to the following Detailed Description and the accompanying drawings.

DETAILED DESCRIPTION

Figure 1:
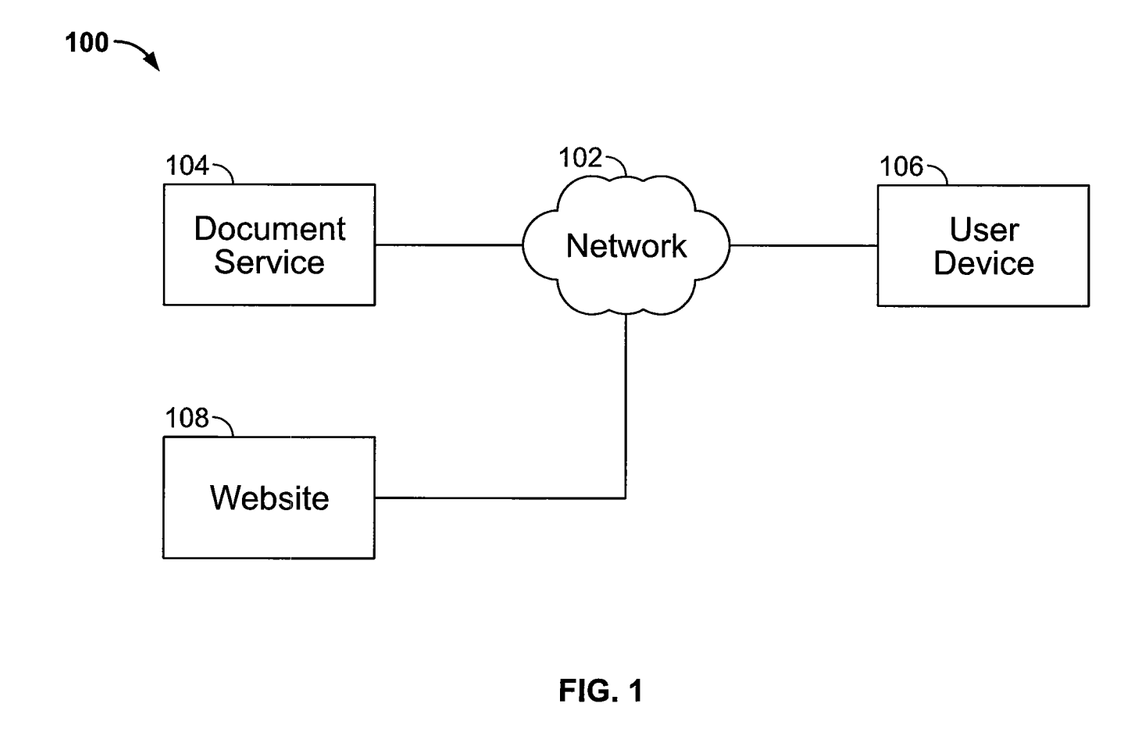
FIG. 1 shows a communication system that may be used to provide access to a document in accordance with an embodiment.

FIG. 1 shows a communication system 100 that may be used to provide access to a document in accordance with an embodiment. Communication system 100 includes a network 102, a document service 104, and a user device 106. Communication system 100 may include more than one user device.

In the exemplary embodiment of FIG. 1, network 102 is the Internet. In other embodiments, network 102 may include one or more of a number of different types of networks, such as, for example, an intranet, a local area network (LAN), a wide area network (WAN), a wireless network, a Fibre Channel-based storage area network (SAN), or Ethernet. Other networks may be used. Alternatively, network 102 may include a combination of different types of networks.

Communication system 100 also includes a website 108. In an embodiment, document service 104 may host website 108 that can be accessed by user device 106. Document service 104 may comprise a server. In an alternative embodiment, website 108 may be hosted by a different server. Document service 104, via website 108, provides user device 106 access to various webpages. In an embodiment, website 108 provides to user device 106 access to one or more webpages providing access to a document stored at document service 104, such as a document 216-A, shown in FIG. 3. User device 106 may access a World Wide Web page on website 108 that may be viewed using a conventional Web browser, for example.

User device 106 may be any device that enables a user to view website 108 via network 102. User device 106 may be connected to network 102 through a direct (wired) link, or wirelessly. User device 106 may have a display screen (not shown) for displaying information. For example, user device 106 may be a personal computer, a laptop computer, a workstation, a mainframe computer, a mobile communication device such as a wireless phone, a personal digital assistant, cellular device, a laptop computer, a netbook, a tablet device, etc. Other devices may be used.

Figure 2:
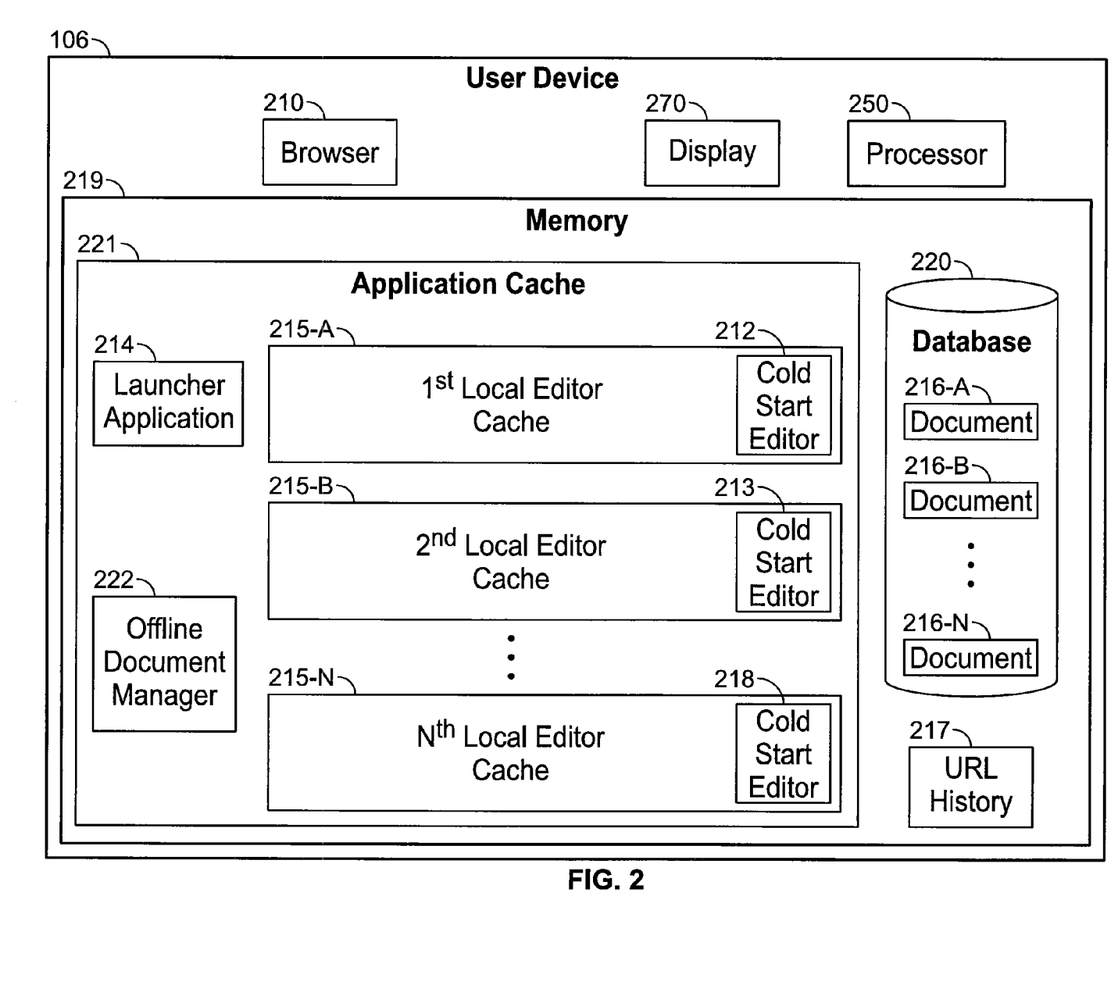
FIG. 2 shows functional components of an exemplary user device in accordance with an embodiment.

FIG. 2 shows functional components of user device 106 in accordance with an embodiment. User device 106 includes a web browser 210 and a display 270. Web browser 210 may be a conventional web browser used to access World Wide Web sites via the Internet, for example. Display 270 provides display of documents, text, images, software applications, webpages, and other information. For example, all or a portion of document 216-A may be displayed on display 270.

User device 106 also includes a memory 219 which stores a launcher application 214, and a plurality of local editor caches ($1^{st}$ local editor cache 215-A, $2^{nd}$ local editor cache 215-B, . . . , $N^{th}$ local editor cache 215-N, hereinafter referred to collectively as 215). Each of local editor caches 215 is capable of loading, displaying, and possibly editing a particular subset of documents 216. Memory 219 also stores a URL (Uniform Resource Locator) history 217. URL history 217 is a compilation of various URL's accessed by user device 106 and may include a date and time when a webpage corresponding to a particular URL was accessed. It also determines which URL is apparent to a user when viewing a page. Memory 219 additionally stores a database 220. Database 220 may store collection of documents, document 216-B, . . . document 216-N. In an embodiment, each document corresponds to one editor cache, but each editor cache can be used for multiple documents. For example, database 220 may comprise a local Structured Query Language (SQL) storage, an IndexedDB storage, a 'window.localstorage' DOM storage, an HTML5 sandbox filesystem, a combination of these technologies, or any other system capable of storing the document collection. Furthermore, database 220 may comprise an application cache 221 (Application Cache). In an embodiment, application cache 221 may store a plurality of local editor caches 215. In an embodiment, application cache 221 may be an AppCache as defined in HyperText Markup Language 5 (HTML5).

In an alternate embodiment, application cache 221, URL history 217, and other components may be contained in the browser. In another alternate embodiment, database 220 may include application cache 221 and other components.

Each of the plurality of local editor caches 215 includes a cold start editor. In the illustrative embodiment depicted by FIG. 2, $1^{st}$ local editor cache 215-A includes cold start editor 212; $2^{nd}$ local editor cache 215-B includes cold start editor 213 and $N^{th}$ local editor cache 215-N includes cold start editor 218. The cold start editor is to be used when the user wishes to start editing a document and user device 106 is in an offline mode. The cold start editor is described in detail below.

In an embodiment, user device 106 may be a non-public device, such as a personal laptop or a computer provided to an employee by an employer. The user may be required to give permission prior to storing documents onto their local devices. Document service 104, in communication with user device 106, may conduct opt-in procedures for a new user (to ask permission prior to storage of their documents locally), and the opt-out procedure for users who no longer wish to access documents offline on the particular device. Therefore, only trusted devices can access documents in an offline mode, while untrusted ones would be limited to online access.

In an embodiment, editors may obtain the contents of the document for viewing either from this local database, from the server, or a combination depending on networking circumstances.

In an alternate embodiment, application cache 221 may be stored within browser 210.

Figure 3:
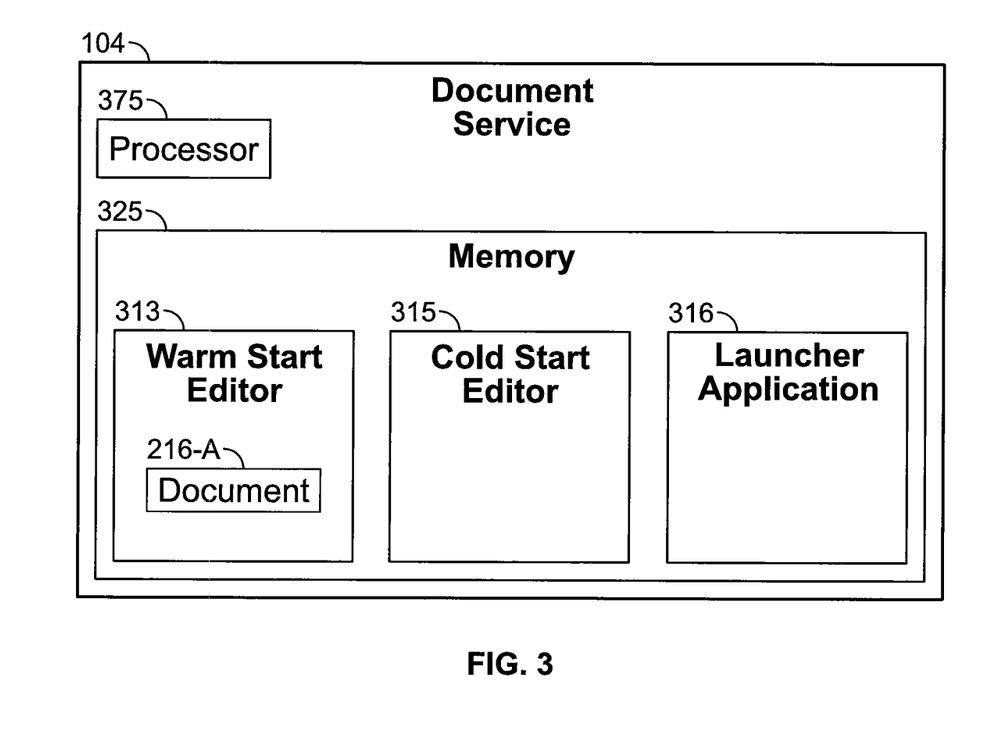
FIG. 3 shows functional components of an exemplary document service in accordance with an embodiment.

FIG. 3 shows functional components of document service 104 in accordance with an embodiment. Document service 104 includes a processor 375 and a memory 325. Memory 325 stores documents and other data. For example, a document 216-A, created and/or edited by a user of user device 106, may be stored in memory 325, as shown in FIG. 3. In an alternative embodiment, document 216-A may be stored external to document service 104. Document 216-A, stored in document service 104 or external to document service 104 (e.g. stored at a different server), may also be cached locally onto user device 106. Therefore, a copy of document 216-A is stored on user device 106. In an embodiment, when document 216-A is altered on document service 104, document service 104 transmits the altered document, or data representing the altered document, to user device 106. Thereafter, user device 106 caches the altered or updated document.

Memory 325 may also store warm start editor 313 which includes document 216-A, cold start editor 315, and launcher application 316. Document service 104 may include other components not shown in FIG. 3. In an embodiment, document service 104 provides cold start editor 315, launcher application 316, and warm start editor 313 to user device 106. User device 106 may then launch and/or execute any of cold start editor 315, launcher application 316, and warm start editor 313.

Figure 4:
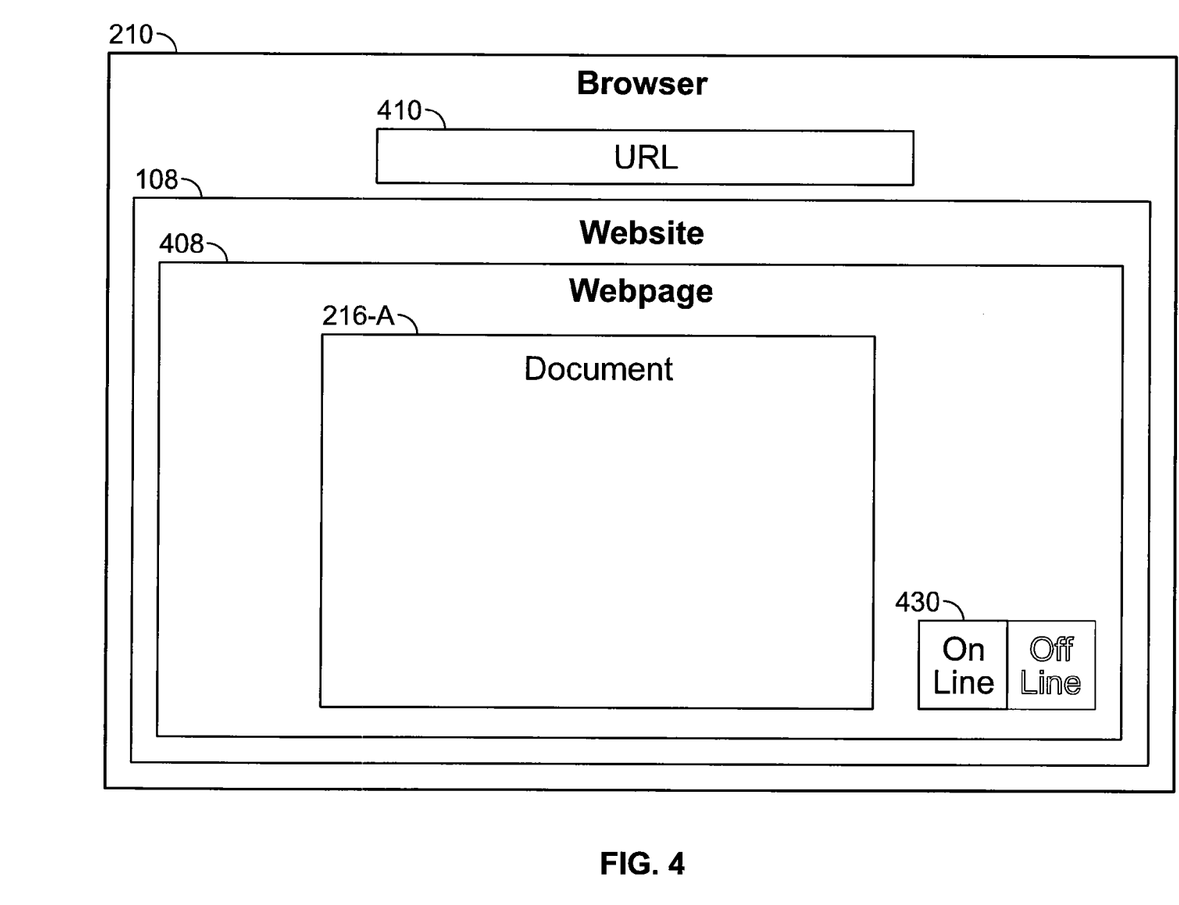
FIG. 4 shows a document displayed in an editor implemented as a web page in accordance with an embodiment.
Figure 6:
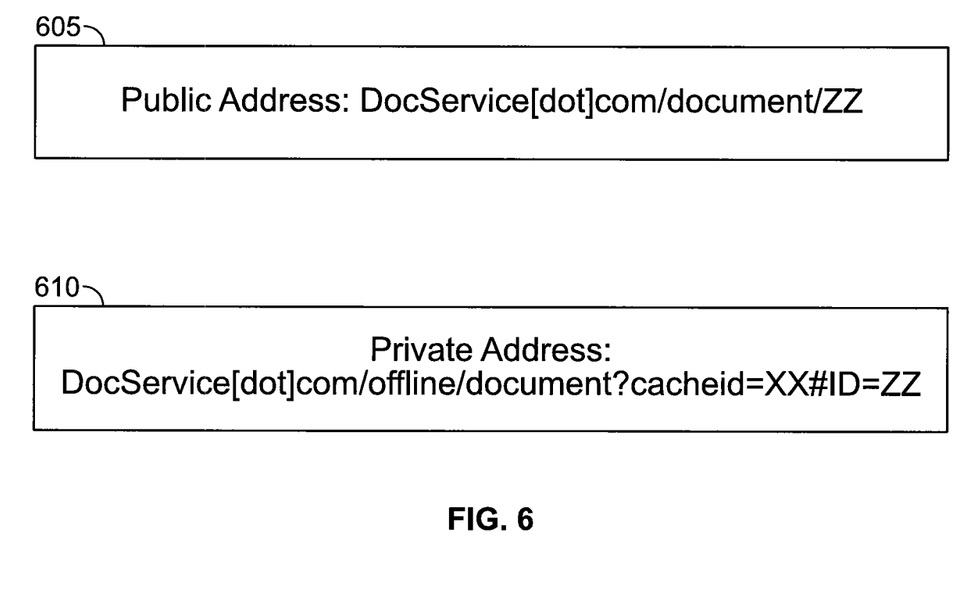
FIG. 6 shows a public address and private address associated with a document in accordance with an embodiment.

Supposing that the user employs user device 106 to access document 216-A, the user may access the document via website 108, for example, based on an address (such as a URL) associated with the document, FIG. 4 shows document 216-A displayed in an editor implemented as a webpage 408 in accordance with an embodiment. Webpage 408 is a part of website 108 and can be accessed by a user of user device 106. Thus, document 216-A is displayed to a user employing user device 106, within browser 210, via webpage 408. In the illustrative embodiment, website 108 also displays a public URL 410 associated with document 216-A. An example of a public address (or a public URL address) is shown in FIG. 6. The term address as used herein may refer to a location, or a pointer to a location, such as a URL, for example. In an embodiment, browser 210 may optionally display inline with website 108 (or anywhere else on screen) an offline/online indicator 430 which indicates whether or not user device 106 is online and able to connect with document service 104, via network 102. In an embodiment, all URLs, public and private, may be in the same origin as defined in the HTML web apps standard section 6.3. In an embodiment, a document manager may allow a user to select which document they wish to view or edit (e.g. by choosing from a document list). There may be two versions of the document manager, one for offline use and one for online. Offline document manager 222, shown in FIG. 2, may construct the private URL for the application cached editor application, and may launch it. Offline document manager 222 may have an address distinct from that of its online counterpart, such as DocService [dot]com/offline. The document manager's user interface may include a table. The table may include document titles, the date at which the documents were last locally viewed while online and therefore synchronized. Offline document manager 222 may be stored in an application cache.

The document manager may display a document list to enable users to select a document to view or edit. The document list may include secondary information, such as whether the given document is holding undelivered local changes (described below). In an embodiment, the document manager may play a role in "application cache maintenance" as it is capable of calculating the set of editor application caches necessary to launch any or all of the documents and updating them.

Warm Start Editor

When a user employing user device 106 is able to go online and access documents stored on document service 104, via network 102, user device 106 requests execution of warm start editor 313. In an embodiment, warm start editor 313 is only capable of being started when user device 106 is in an online state. For example, an online state may be verified through a successful ping or attempted access to the web. Warm start editor 313, is provided by the document server for immediate execution on the user device when display of a document is requested, and may not be locally stored. The requested document may be co-mingled with application code. In an embodiment, the co-mingling may allow certain latency optimization. During startup, the warm start editor may store the document in database 220, or update any version already stored there.

For example, when user device 106 requests access to document 216-A in an online mode, document 216-A is fetched from document service 104. In an alternate embodiment, warm start editor 313 may also use cached images, document data, and/or webfonts stored by user device 106 in memory 219 or database 220 rather than fetching them from document service 104, in an effort to reduce load time when loading document 216-A. As long as the user device is online, any warm start editors running on it maintain a connection to document service 104. This enables them to continually synchronize the documents they are displaying, and any version stored in database 220, with that of the server. If the user device goes offline while a warm-start editor is running, it may continue to run, and may allow editing. After a user returns from going offline, any warm start editors running on the user device may reconnect with document service 104, and may synchronize the documents they are displaying as well as the versions stored in database 220.

In warm start (i.e. when warm start editor 313 is employed), the document is found co-mingled with the editor application rather than having to be fetched via an XMLHttpRequest (XHR). This sequence may also be an implementation of the warm start startup sequence.

Cold Start Editor

When a user employing user device 106 is in an offline mode and attempts to access document 216-A, user device 106 launches cold start editor 212. Cold start editor 212 may comprise an application cache, which may comprise an application cache manifest. The application cache manifest is a list of all URLs a webpage uses. The application cache manifest is provided to a browser, such as browser 210. The resource mentioned within the application cache manifest are structured to exclude document 216-A, although they may contain user-specific data. The application cache manifest is described in detail below. Each cold-start editor has a private URL, which is not advertised. Users usually request their documents using public URLs which describe resources only available online. Launcher application 214 intercepts such requests, creates the corresponding private address and navigates to it, causing (for example) cold start editor 212 to be retrieved from $1^{st}$ local editor cache 215-A and started. Cold start editor 212 then replaces the apparent URL of the page, which would otherwise show the private address, with the public address. It then appears that the public address was navigated to all along. This provides a familiar experience to the user, and ensures that any recording of the apparent URL, for example as a bookmark, does not include the private address. An example of private address 610 is shown in FIG. 6. In an embodiment, HyperText Markup Language 5 (HTML5) history application programming interfaces (APIs) may be used to disguise private address 610. Private address 610 comprises components which identify an editor cache, others that identify a documents, and additional information. In an embodiment, when started, cold start editor 212 reads its private URL and determines which document the user intended to open. It then reads a user record from database 220 to find the current offline user (e.g. a user employing user device 106 who has opted-in to allow local caching of documents). The user record may list one or more users who have rights to access corresponding documents. For example, the playwright in the example above may be listed as a user who has access to the play. Once it is determined that the user is agreed to and given permission to access a locally stored document, cold start editor 212 reads document 216-A from database 220, and a display of it is provided.

In cases where a cold start editor (i.e. when cold start editor 212 is employed) is started when online, a Hypertext Transfer Protocol (http) request may be made, which accepts an identification of a document (i.e. document ID) and returns data comprising a JavaScript Object Notation (JSON) response containing the document. This is used to populate the local database and render document 106.

Editor Applications

In an embodiment, the cold start editors (e.g. cold start editors 212, 213 and 218) and launcher application 214 are adapted to run from an application cache (e.g. application cache 221). In an embodiment, none of the cold-start editor application's JavaScript (JS) or HTML components includes anything which references a particular document, and are capable of bootstrapping and running without a network. In an embodiment, there may be a single application to cover both editing and read-only modes; with the read-only mode disabling editing features. In some situations, multiple editor application caches are installed on user device 106 under different manifest and master entry URLs. Each document may require a particular cold start editor to open, which will be stored in a particular local editor cache. In order to determine which local editor cache to use, many factors may be used. For example, one of the factors may be the document type (e.g. text, spreadsheet etc).

Figure 5:
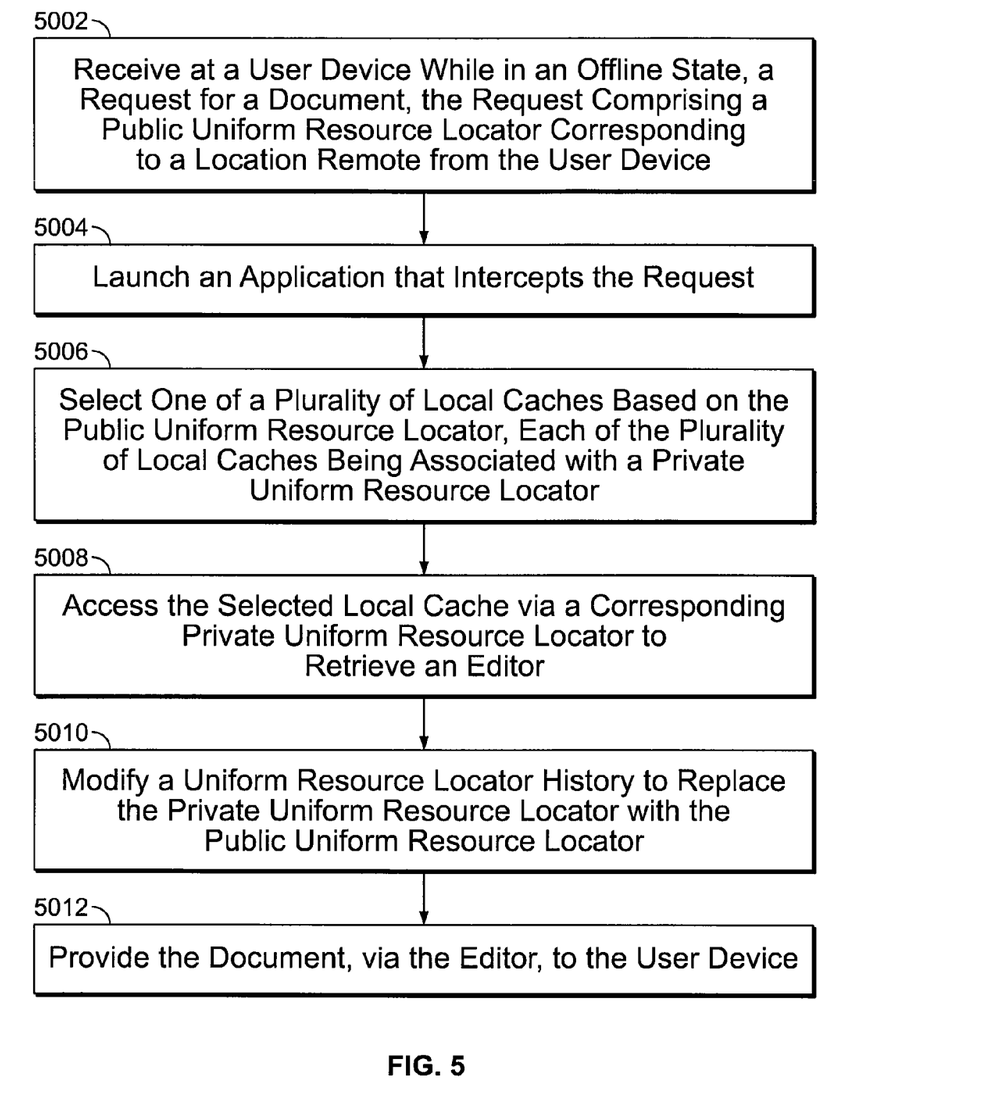
FIG. 5 is a flowchart depicting a method of providing access to a document in an offline state in accordance with an embodiment.

Details about how document 216-A is accessed by user device 106 in an offline state are described herein with respect to FIG. 5.

FIG. 5 is a flowchart depicting a method of providing access to a document in an offline state in accordance with an embodiment. At step 5002, a request for a document is received at a user device while in an offline state. The request comprises a public uniform resource locator corresponding to a location remote from the user device. For example, the request for document 216-A may be received at user device 106 while in an offline state (e.g. due to a temporary or permanent disruption in the network, or a spotty connection). The request comprises public URL 410 which corresponds to a location remote from user device 106. For example, public URL 410 may be public address 605 which may point to a location of document 216-A stored on document service 104. In an embodiment, suppose that the playwright is traveling to Milan on a train. The playwright (who may or may not be aware that his device is offline), wishes to access his play. He sends a request for the play by clicking on, typing, or otherwise accessing a public URL corresponding to a remote location storing his play.

In an embodiment, the location remote from the user device is accessible via a network, (e.g. the Internet). For example, the location may point to a location where document 216-A is stored on document service 104 and may be accessible via network 102 (i.e. the Internet). In an embodiment, document 216-A is stored at database 220 on the user device 106.

At step 5004, an application is launched that intercepts the request. As user device 106 is in an offline mode, launcher application 214 intercepts the request including public URL 410. In an embodiment, launcher application 214 is launched to intercept public URL 410 which may be public address 605. In an embodiment, application cache 221 may cause launcher application 214 to intercept the public URL. Thus, the launching of an application that intercepts the public uniform resource locator further comprises launching an application cache. For example, launching launcher application 214 further comprises launching application cache, which selects cold start editor application 212, as cold start editor application 212 is associated with document 216-A.

At step 5006, one of a plurality of local caches is selected based on the public uniform resource locator, where each of the plurality of local caches is associated with a private uniform resource locator. Thus, $2^{nd}$ local editor cache 215-B is selected from among the plurality of local editor caches 215 based on public URL 410 (which may be public address 605). Each of the plurality of local editor caches 215 is associated with at least one private URL (or private address, e.g. private address 610).

At step 5008, the selected local cache is accessed via a corresponding private uniform resource locator to retrieve an editor. Accordingly, $2^{nd}$ local editor cache 215-B is accessed, via corresponding private address 610, to retrieve cold start editor 213. In an embodiment, private address 610 comprises an address of an Internet page with a locally cached copy, which is reliably available while offline. Once the cold-start editor has started, it retrieves document 216-A from database 220 and a display of the document is provided.

At step 5010, a uniform resource locator history is modified to replace the private uniform resource locator with the public uniform resource locator. Referring to FIG. 2, URL history 217 is modified to replace private address 610 (or a private URL) with the public address 605 (e.g. public URL 410). In this way, private address 610 (which may not be viewable by the user) is masked and in URL history 217, it appears that only public address 605 was accessed, and not private address 610. Thus, URL history 217 does not comprise any indication that in an offline mode, one or more private URL's were accessed to obtain documents. In an embodiment, when the playwright views URL history 217, it appears that he has accessed public address 605 and there is no indication that he accessed private address 610 to access a cached copy of document 216-A. In an embodiment, the masking is performed by programmatically manipulating the browser history. This masking affects the apparent URL of the editor page while it is being viewed, as well as the history.

At step 5012, the document is provided, via the cold start editor, to the user. Document 216-A is provided, via cold start editor 213, to the user employing user device 106. Therefore, even when the playwright's device is in an offline state, the playwright may still access document 216-A, as a local copy of document 216-A is cached locally in database 220.

In one example, launcher application 214 starts in response to a user's navigation operation, reads the URL the user has entered, and determines that there is a request for a document. Launcher application 214 checks to determine if that document is in local storage at the user's device. If the document is found in local storage, launcher application 214 may have knowledge of the document type to determine which editor cache may be used. For example, if the document is a spreadsheet document, an editor cache containing a spreadsheet application may be used. Launcher application 214 then constructs a private URL for selected editor cache and launches the private URL.

In an embodiment, information about the document and the user device is retrieved from storage. Document service 104 retrieves information about document 216-A and user device 106 from storage and/or database 220.

Details regarding how launcher application 214 enables selection of document 216-A are described in detail herein below.

Launcher Application

Launcher application 214 (e.g. an application cached launcher application) intercepts requests for document 216-A via its public URL. Launcher application 214 launches the correct version of a corresponding cold start editor to provide displaying of document 216-A to a user. Launcher application 214 constructs a cold start editor 212 URL, as cold start editor 212 is associated with document 216-A, which launches the cold-start editor version required for document 216-A and selected user. Once cold start editor 212 has launched, it may use the HTML5 history Application Programming Interface (API) to modify its own apparent URL to be one for a warm start editor 313.

Via the use of an application cache manifest fallback entry, launcher application 214 intercepts attempts to use URLs under DocService[dot]com while offline. Using private address 610 of document 216-A (which is stored in local editor cache 215-B on user device 106), launcher application 214 may launch document 216-A using the cold start editor 212. In addition, the online document manager's URL may be intercepted by the launcher and offline document manager 222 started in its place.

In an embodiment, a document manager application may present a list of document URLs. In an embodiment, the offline variant of the document manager may be a part of launcher application 214. In an alternate embodiment as depicted in FIG. 2, offline document manager 222 may be separate from launcher application 214 and may be launched by launcher application 214, when an attempt to navigate to the online document manager's URL is intercepted. When a selection of a document and/or associated document URL is made by a user employing user device 106 in an offline state, offline document manager 222 chooses and launches the proper cold start editor associated with the document. It may do this with the assistance of launcher application 214, or on its own.

Referring now to FIG. 6 which shows examples of a public address and a private address associated with a document. An example of a public address 605 used to access document 216-A is DocService[dot]com/document/ZZ. An example of a private address 610 used to access document 216-A (at a local machine, user device 106) is DocService[dot]com/offline/document?cacheid=XX#ID=ZZ. In an embodiment, "XX" appearing after "uc" is the user's characteristics string. In an embodiment, a document ID appears after the "#ID=." In an embodiment, the document ID and any other information encoded in the URL's "fragment identifier component" may not play a role in application cache selection. It is instead read by cold start editor 212 on startup to determine which document (e.g. document 216-A, document 216-B, ..., document 216-N) to load from the plurality of local cache editors 215, and possibly other information. The "uc" string (and optionally, some other parts of the URL), include information for document service 104 to determine which binary to serve, in an online mode.

Figure 7:
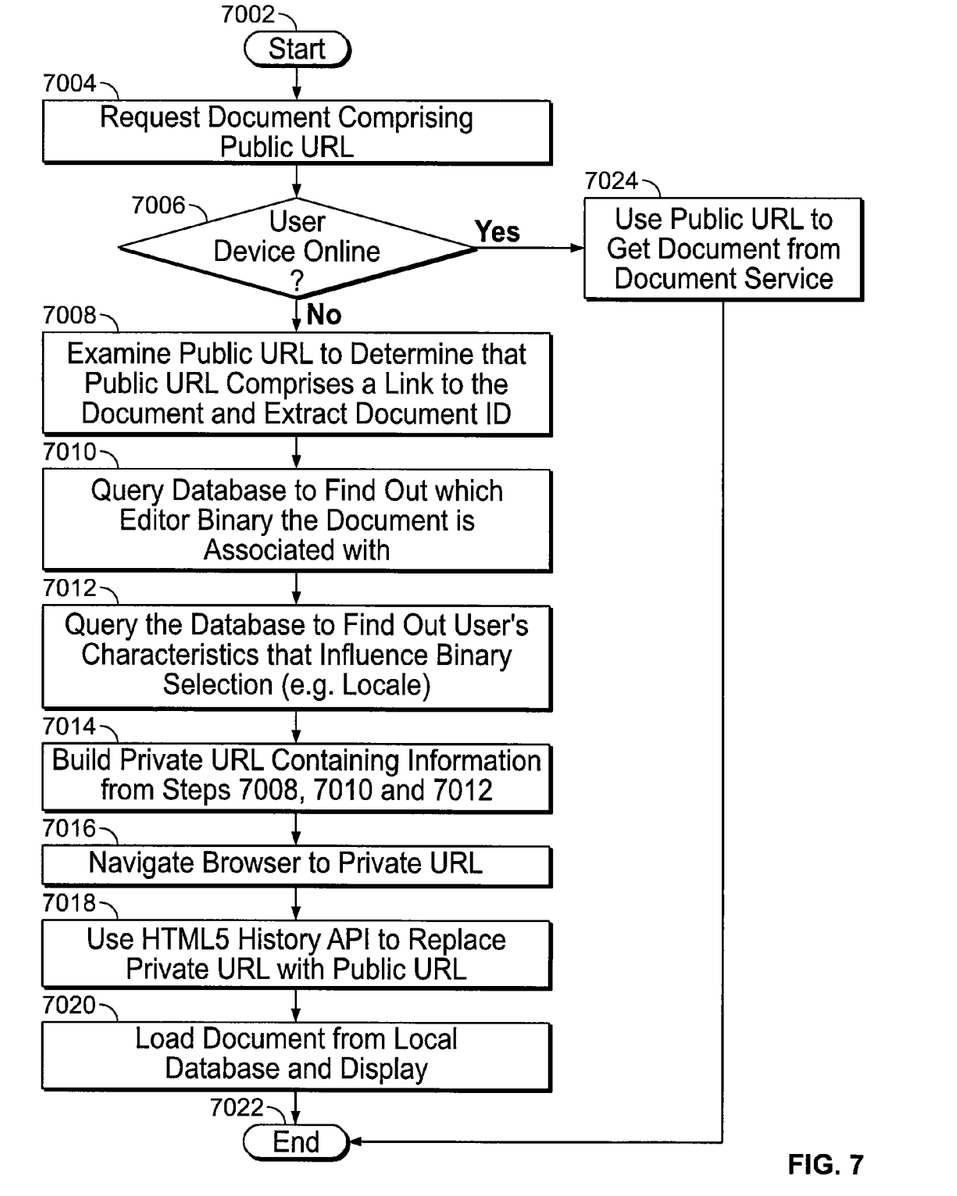
FIG. 7 is a flowchart depicting a method of accessing a document in accordance with an embodiment.

Details regarding accessing a document will herein be described in reference to FIG. 7. FIG. 7 is a flowchart depicting a method of accessing a document in accordance with an embodiment. At step 7002, the flowchart or routine starts. At step 7004, a document comprising a public URL is requested. For example, a user employing user device 106 requests document 216-A by typing, selecting, clicking on or otherwise accessing public URL 410 (e.g. public address 605) associated with document 216-A.

At step 7006, a determination is made whether the user device is online. User device 106 determines, in any of a number of ways, whether or not it is in an online state. If it is determined that user device 106 is in an online state, the flowchart proceeds to step 7024. At step 7024, the public URL is used to get the warm start editor, including the document, from document service. User device 106 uses public URL 410 to retrieve a warm start editor, including document 216-A from document service 104 and the flowchart then ends at step 7022 when the warm start editor is started and the document is displayed.

In response to determining in step 7006 that user device 106 is not in an online state, the flowchart or routine proceeds to step 7008. For example, the browser determines that user device 106 is in an offline state or mode.

At step 7008, the public URL is examined by the launcher application to determine whether the public URL comprises a link to the document. If so, the document ID is extracted. When launcher application 214 intercepts a request for document 216-A, launcher application 214 examines public URL 410 (e.g. click, selection, command, or other access request) to find the document ID to extract. In an embodiment, the document ID may be extracted from public URL 410 (which may be public address 605) or obtained by other means.

At step 7010, the database is queried to find out which cold start editor the document is associated with. In an embodiment, database 220 is queried to find out which cold start editor document 216-A is associated with. Factors associated with the user and the document may be considered when selecting the editor binary.

At step 7012, the database is queried to ascertain the user's characteristics that influence binary selection. In an embodiment, database 220 is queried to ascertain the user's characteristics that influence the binary selection.

At step 7014, a private URL is built containing information from steps 7008, 7010 and 7012. For example, private address 610 may be built in a form depicted by FIG. 6.

At step 7016, the launcher application causes the browser to navigate to a private URL. Browser 210 navigates to private address 610.

At step 7018, the HTML5 history API to used to replace the private URL with its equivalent public URL. As described above for example, the HTML5 history API is used to replace private address 610 with public address 605.

At step 7020, the document is loaded from local database and displayed. Document 216-A (and data associated with document 216-A) is loaded from database 220 and displayed to a user employing user device 106. The flowchart then proceeds to the end, in step 7022.

In an alternate embodiment, first, the cold start editor attempts to contact document service 104 to load document 216-A. If this step fails, document 216-A is loaded from local database 220. As explained above, cold start editors may not include a version of the document co-mingled with the application.

As cold start editor 212 is only used when user device 106 is used to start documents while it is in an offline mode, it may have a different start up procedure from warm start editor 313.

When a user is unable to access the Internet and is unable to go online (e.g. due to a temporary or permanent disruption in the network, or a spotty connection) the user may access document 216-A via any device (e.g. user device 106) which contains the correct document data in its database 220 and the correct cold-start editor among its editor caches.

Bulk Synchronizer

A bulk synchronizer synchronizes documents without an editor needing to be open. In an embodiment, the bulk synchronizer is used while user device 106 is online. In an embodiment, the bulk synchronizer may take the form of a shared worker, which all editors and document managers may connect to. The bulk synchronizer may be application cached. Documents which have an editor currently open may not be synchronized by this worker, and it may play a role in coordinating the database access of multiple editors which have the same document open. Documents which are chosen for offline access and do not have an editor open can be regularly synchronized by this piece. The subset of the user's server-stored documents the bulk synchronizer chooses to store on the client may depend on various factors. These may include manual user selection, and automated determinations based on document content and user activity. For example, recently opened documents may be stored. Documents may enter or leave this offline subset, requiring the bulk synchronizer to remove existing locally stored documents and add new ones, as well as updating existing ones. The bulk synchronizer may remain active only when a document manager or editor is open, or it may remain active permanently.

Storing and Delivering Unsaved Changes

Changes made to a document while offline can be stored in a separate data structure from committed mutations (i.e. made while in an online mode and delivered to the server) at user device 106. They can be delivered either when the session which produced them goes back online or when user device 106 starts up online with offline changes present. In this case offline changes may be delivered either by the bulk synchronizer or by an editor session opened to edit that document. Once this delivery is complete, these changes may be removed from separate client storage, and the client's stored version of the document updated to include them.

Editing of Document while Offline

In an embodiment, warm start documents may serve different web applications for the writable and read-only versions. The offline cold start editor 212 (described above) may be capable of displaying itself in read-only or writable modes. Read-only modes are writable modes with all the editing actions disabled and editing-related controls disabled or not displayed.

In an embodiment, document editors make continuous attempts to establish a network connection to document service 104. If communication is established, attempts are made to fetch any updates to the document known to the server, and deliver locally made changes to it. If communication attempts are thwarted, because the browser does not possess valid authentication credentials, a user interface can be shown soliciting credentials.

In writable mode, changes to document 216-A can be made. Suppose now that the playwright wishes to add a fourth act to his play while riding on the train to Milan. Any changes made to the play document are stored locally, and when the playwright's device is able to go back online, all changes stored on his device are transmitted to document service 104. Changes made by the playwright may be stored in the same data structure as the document. That structure would include an indication of whether any undelivered local changes are stored. In an alternate embodiment, undelivered changes may be stored in a separate data structure.

In an embodiment, edits made to document 216-A at user device 106 are stored. For example, as described above, undelivered local changes are stored. When user device 106 connects with document service 104, the changes are transmitted to the server (i.e. document service 104).

In an embodiment, user device 106 transmits a request to the server (i.e. document service 104) to poll for updates to document 216-A. This way, document 216-A stored locally on user device 106 is synchronized with document 216-A stored on document service 104 and any changes made by collaborators or other users are received by user device 106. In response to polling the server for updates to document 216-A, user device 106 receives the updates.

When the user selects document 216-A, while user device 106 is in an offline mode, application cache 221 determines which of a plurality of local editor caches 215 should be used to open document 216-A. The determination may be based on a combination of characteristics associated with the user and document 216-A.

In various embodiments, the method steps described herein, including the method steps described in FIGS. 5 and 7, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIGS. 5 and 7. Certain steps of the methods described herein, including one or more of the steps of FIGS. 5 and 7, may be performed by a server or by another processor in a network-based cloud-computing system. Certain steps of the methods described herein, including one or more of the steps of FIGS. 5 and 7, may be performed by a client computer in a network-based cloud computing system. The steps of the methods described herein, including one or more of the steps of FIGS. 5 and 7, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 5 and 7, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 8:
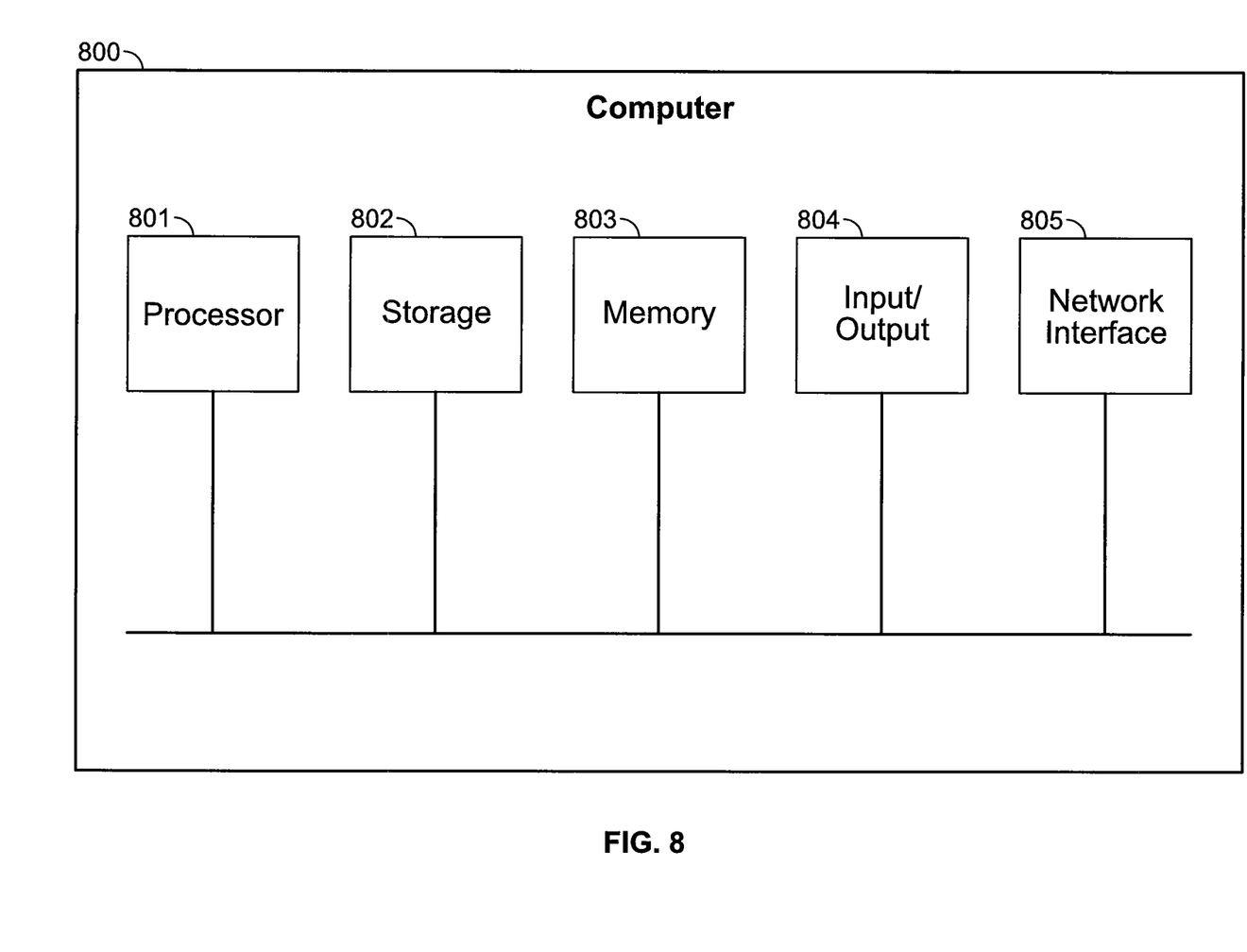
FIG. 8 shows components of a computer that may be used to implement the invention.

A high-level block diagram of an exemplary computer that may be used to implement systems, apparatus and methods described herein is illustrated in FIG. 8. Computer 800 includes a processor 801 operatively coupled to a data storage device 802 and a memory 803. Processor 801 controls the overall operation of computer 800 by executing computer program instructions that define such operations. The computer program instructions may be stored in data storage device 802, or other computer readable medium, and loaded into memory 803 when execution of the computer program instructions is desired. Thus, the method steps of FIGS. 5 and 7 can be defined by the computer program instructions stored in memory 803 and/or data storage device 802 and controlled by the processor 801 executing the computer program instructions. For example, the computer program instructions can be implemented as computer executable code programmed by one skilled in the art to perform an algorithm defined by the method steps of FIGS. 5 and 7. Accordingly, by executing the computer program instructions, the processor 801 executes an algorithm defined by the method steps of FIGS. 5 and 7. Computer 800 also includes one or more network interfaces 804 for communicating with other devices via a network. Computer 800 also includes one or more input/output devices 805 that enable user interaction with computer 800 (e.g., display, keyboard, mouse, speakers, buttons, etc.).

Processor 801 may include both general and special purpose microprocessors, and may be the sole processor or one of multiple processors of computer 800. Processor 801 may include one or more central processing units (CPUs), for example. Processor 801, data storage device 802, and/or memory 803 may include, be supplemented by, or incorporated in, one or more application-specific integrated circuits (ASICs) and/or one or more field programmable gate lists (FPGAs).

Data storage device 802 and memory 803 each include a tangible non-transitory computer readable storage medium. Data storage device 802, and memory 803, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 805 may include peripherals, such as a printer, scanner, display screen, etc. For example, input/output devices 805 may include a display device such as a cathode ray tube (CRT) or liquid crystal display (LCD) monitor for displaying information to the user, a keyboard, and a pointing device such as a mouse or a trackball by which the user can provide input to computer 800.

Any or all of the systems and apparatus discussed herein, including document service 104, user device 106, website 108 and components thereof, including web browser 210, display 270, processor 250, memory 219, processor 375, and memory 325, may be implemented using a computer such as computer 800.

One skilled in the art will recognize that an implementation of an actual computer or computer system may have other structures and may contain other components as well, and that FIG. 8 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method comprising:
receiving, at a user device while the user device is in an offline state, a request comprising a public uniform resource locator comprising: (1) a domain identifier of a location remote from the user device, and (2) a document identifier of a remote copy of a document, the remote copy being stored at the location remote from the user device;
in response to receiving the request and determining that the user device is in the offline state, launching a launcher application using a fallback entry of an application cache manifest, the application cache manifest comprising a first list of all uniform resource locators used by the document;
intercepting, by the launcher application, the request;
selecting, by the launcher application, one of a plurality of local caches based on the document identifier;
constructing, by the launcher application, a private uniform resource locator comprising the domain identifier, the document identifier, and a cache identifier of the selected local cache;
accessing the selected local cache via the private uniform resource locator to retrieve an editor;
after accessing the selected local cache, adding the private uniform resource locator to a uniform resource locator history that comprises a second list of uniform resource locators of documents that were previously accessed using the user device;
modifying, at the user device, the uniform resource locator history to replace the private uniform resource locator with the public uniform resource locator; and
providing, while the user device is in the offline state, a local copy of the document that is stored locally on the user device, via the editor, to a display on the user device.

2. The method of claim 1, wherein:
the editor is a cold start editor that launches in response to receiving the request and determining that the user device is in the offline state,
the local copy is stored at a database on the user device, and
the cold start editor provides the local copy of the document to the display on the user device only after determining that a user at the user device is authorized to access the local copy.

3. The method of claim 1, wherein the editor is a cold start editor that launches in response to receiving the request and determining that the user device is in the offline state, the method further comprising:
in response to determining that the user device is in an online state, launching a warm start editor configured to communicate with the remote location to provide the remote copy of the document to the display on the user device and to continually synchronize the document with the remote location.

4. The method of claim 1, wherein the selecting, by the launcher application, one of the plurality of local caches comprises:
examining, by the launcher application, whether the public uniform resource locator includes a link to the remote copy of the document;
in response to determining that the public uniform resource locator includes the link, extracting the document identifier; and
constructing the private uniform resource locator based at least in part on the document identifier, wherein the providing the local copy of the document comprises navigating to the private uniform resource locator.

5. The method of claim 4, wherein the private uniform resource locator is constructed by querying a database on the user device to select the editor from a plurality of cold start editors, the editor being selected based on the document identifier.

6. The method of claim 2, wherein the cold start editor determines that the user is authorized to access the local copy when the user is granted permission to store the local copy of the document locally on the user device.

7. The method of claim 1, wherein the uniform resource locator history is modified in order to mask the private uniform resource locator, such that the uniform resource locator history does not include any indication that while the user device was in the offline state, the private uniform resource locator was accessed.

8. The method of claim 1, wherein the launcher application does not intercept the request when the user device is not in the offline state.

9. The method of claim 1, wherein each of the plurality of local caches is associated with a respective cache identifier, and using the launcher application to select one of the plurality of local caches further comprises selecting based on a type of the document.

10. A non-transitory computer readable medium storing computer program instructions, which, when executed on a processor, cause the processor to perform a method comprising:
  receiving, at a user device while the user device is in an offline state, a request comprising a public uniform resource locator comprising: (1) a domain identifier of a location remote from the user device, and (2) a document identifier of a remote copy of a document, the remote copy being stored at the location remote from the user device;
  in response to receiving the request and determining that the user device is in the offline state, launching a launcher application using a fallback entry of an application cache manifest, the application cache manifest comprising a first list of all uniform resource locators used by the document;
  intercepting, by the launcher application, the request;
  selecting, by the launcher application, one of a plurality of local caches based on the document identifier;
  constructing, by the launcher application, a private uniform resource locator comprising the domain identifier, the document identifier, and a cache identifier of the selected local cache;
  accessing the selected local cache via the private uniform resource locator to retrieve an editor;
  after accessing the selected local cache, adding the private uniform resource locator to a uniform resource locator history that comprises a second list of uniform resource locators of documents that were previously accessed using the user device;
  modifying, at the user device, the uniform resource locator history to replace the private uniform resource locator with the public uniform resource locator; and
  providing, while the user device is in the offline state, a local copy of the document that is stored locally on the user device, via the editor, to a display on the user device.

11. The non-transitory computer readable medium of claim 10 wherein:
  the editor is a cold start editor that launches in response to receiving the request and determining that the user device is in the offline state,
  the local copy is stored at a database on the user device, and
  the cold start editor provides the local copy of the document to the display on the user device only after determining that a user at the user device is authorized to access the local copy.

12. The non-transitory computer readable medium of claim 10 wherein the editor is a cold start editor that launches in response to receiving the request and determining that the user device is in the offline state, the medium further comprising instructions defining the step of:
  in response to determining that the user device is in an online state, launching a warm start editor configured to communicate with the remote location to provide the remote copy of the document to the display on the user device and to continually synchronize the document with the remote location.

13. The non-transitory computer readable medium of claim 10, wherein the selecting, by the launcher application, one of the plurality of local caches comprises:
  examining, by the launcher application, whether the public uniform resource locator includes a link to the remote copy of the document;
  in response to determining that the public uniform resource locator includes the link, extracting the document identifier; and
  constructing the private uniform resource locator based at least in part on the document identifier, wherein the providing the local copy of the document comprises navigating to the private uniform resource locator.

14. The non-transitory computer readable medium of claim 13, wherein the private uniform resource locator is constructed by querying a database on the user device to select the editor from a plurality of cold start editors, the editor being selected based on the document identifier.

15. The non-transitory computer readable medium of claim 11, wherein the cold start editor determines that the user is authorized to access the local copy when the user is granted permission to store the local copy of the document locally on the user device.

16. The non-transitory computer readable medium of claim 10, wherein the uniform resource locator history is modified in order to mask the private uniform resource locator, such that the uniform resource locator history does not include any indication that while the user device was in the offline state, the private uniform resource locator was accessed.

17. The non-transitory computer readable medium of claim 10, wherein the launcher application does not intercept the request when the user device is not in the offline state.

18. The non-transitory computer readable medium of claim 10, wherein each of the plurality of local caches is associated with a respective cache identifier, and using the launcher application to select one of the plurality of local caches further comprises selecting based on a type of the document.

19. A system comprising a processor configured to:
  receive, at a user device while the user device is in an offline state, a request comprising a public uniform resource locator comprising: (1) a domain identifier of a location remote from the user device and (2) a document identifier of a remote copy of the document, the remote copy being stored at the location remote from the user device;
  in response to receiving the request and determining that the user device is in the offline state, launch a launcher application by using a fallback entry of an application cache manifest, the application cache manifest comprising a first list of all uniform resource locators used by the document;
  intercept, by the launcher application, the request;
  select, by the launcher application, one of a plurality of local caches based on the document identifier of the public uniform resource locator,
  construct, by the launcher application, a private uniform resource locator comprising the domain identifier, the document identifier, and a cache identifier of the selected local cache;
  access the selected local cache via the private uniform resource locator to retrieve an editor;
  after accessing the selected the local cache, add the private uniform resource locator to a uniform resource locator history that comprises a second list of uniform resource locators of documents that were previously accessed using the user device;

modify, at the user device, the uniform resource locator history to replace the private uniform resource locator with the public uniform resource locator; and provide, while the user device is in the offline state, a local copy of the document that is stored locally on the user device, via the editor, to a display on the user device.

20. The system of claim 19, wherein the processor is configured to select, using the launcher application, one of the plurality of local caches by:

examining, by the launcher application, whether the public uniform resource locator includes a link to the remote copy of the document;

in response to determining that the public uniform resource locator includes the link, extracting the document identifier corresponding to the document; and constructing the private uniform resource locator based at least in part on the document identifier, wherein the providing the local copy of the document comprises navigating to the private uniform resource locator.

\* \* \* \* \*